(12) United States Patent
Henry et al.

(10) Patent No.: US 11,489,390 B2
(45) Date of Patent: Nov. 1, 2022

(54) STATOR ASSEMBLY INCLUDING INSULATION MEMBER AND METHOD OF ASSEMBLY THEREOF

(71) Applicant: Regal Beloit America, Inc., Beloit, WI (US)

(72) Inventors: Joseph Aaron Henry, Dayton, OH (US); Shirish Vatkar, Tipp City, OH (US); Paul Nathanael Selking, Ossian, IN (US); Alan Jacob Manz, Paulding, OH (US); Don James Bray, Sparta, MO (US)

(73) Assignee: Regal Beloit America, Inc., Beloit, WI (US)

( * ) Notice: Subject to any disclaimer, the term of this patent is extended or adjusted under 35 U.S.C. 154(b) by 897 days.

(21) Appl. No.: 16/023,280

(22) Filed: Jun. 29, 2018

(65) Prior Publication Data
US 2019/0006901 A1    Jan. 3, 2019

Related U.S. Application Data

(60) Provisional application No. 62/527,285, filed on Jun. 30, 2017.

(51) Int. Cl.
*H02K 3/32* (2006.01)
*H02K 3/52* (2006.01)
*H02K 1/14* (2006.01)
*H02K 5/22* (2006.01)

(52) U.S. Cl.
CPC ............. *H02K 3/325* (2013.01); *H02K 1/146* (2013.01); *H02K 3/525* (2013.01); *H02K 5/22* (2013.01); *H02K 3/522* (2013.01)

(58) Field of Classification Search
CPC .. H02K 3/32; H02K 1/14; H02K 3/52; H02K 5/22; H02K 1/146; H02K 3/325; H02K 3/522
See application file for complete search history.

(56) References Cited

U.S. PATENT DOCUMENTS

| 9,331,528 | B2 * | 5/2016 | Heins | H02K 1/182 |
| 2005/0044692 | A1 * | 3/2005 | Takano | H02K 15/095 29/605 |
| 2007/0200437 | A1 | 8/2007 | El-Antably et al. | |
| 2013/0009513 | A1 * | 1/2013 | Jang | H02K 3/522 310/254.1 |
| 2014/0015367 | A1 | 1/2014 | Umehara et al. | |

(Continued)

*Primary Examiner* — Gary A Nash
(74) *Attorney, Agent, or Firm* — Armstrong Teasdale LLP

(57) ABSTRACT

A stator assembly includes an annular body extending about a central axis and a plurality of stator teeth extending axially from the annular body and spaced circumferentially about the annular body. The stator assembly includes at least one conduction coil and at least one bobbin configured to support the at least one conduction coil. The at least one bobbin is coupled to a first stator tooth such that the at least one conduction coil extends about the first stator tooth. The stator assembly further includes at least one insulation member configured to couple to a second stator tooth and extend into a slot between the second stator tooth and the at least one conduction coil. The at least one insulation member includes an end wall configured to cover the distal end of the second stator tooth when the at least one insulation member is coupled to the second stator tooth.

18 Claims, 14 Drawing Sheets

(56) References Cited

U.S. PATENT DOCUMENTS

| | | | |
|---|---|---|---|
| 2014/0265673 A1* | 9/2014 | Kreidler | H02K 5/225 |
| | | | 310/71 |
| 2015/0162787 A1 | 6/2015 | Sakaue et al. | |
| 2016/0072359 A1* | 3/2016 | Kreidler | H02K 5/22 |
| | | | 310/68 D |
| 2016/0268866 A1* | 9/2016 | Matsumoto | H02K 15/022 |
| 2016/0285339 A1* | 9/2016 | Smith | H02K 11/30 |
| 2017/0025913 A1 | 1/2017 | Nagahiro et al. | |
| 2017/0141627 A1 | 5/2017 | Seki et al. | |
| 2017/0264178 A1 | 9/2017 | Stauder et al. | |
| 2017/0353070 A1 | 12/2017 | Im et al. | |
| 2018/0145547 A1 | 5/2018 | Saban et al. | |
| 2018/0205280 A1* | 7/2018 | Henry | H02K 15/10 |
| 2019/0221361 A1* | 7/2019 | Manz | H01F 27/306 |

* cited by examiner

STATOR ASSEMBLY INCLUDING INSULATION MEMBER AND METHOD OF ASSEMBLY THEREOF

CROSS REFERENCE TO RELATED APPLICATIONS

This application claims priority to U.S. Provisional Patent Application No. 62/527,285, filed Jun. 30, 2017, which is incorporated herein by reference in its entirety.

BACKGROUND

The field of the disclosure relates generally to electric motors, and more specifically, to electric motors that include a stator assembly and at least one insulation member to insulate components of the stator assembly from electric current flowing through conduction coils.

At least some known electric motors include a stator assembly having a plurality of teeth and conduction coils wrapped around the teeth. In at least some known stator assemblies, the conduction coils are supported by bobbins positioned on the teeth. Electric current is provided to the conduction coils to generate an alternating magnetic flux that causes a rotor of the motor to rotate. In at least some known motors, the stator assembly includes insulation for the conduction coils. However, the insulation is difficult to secure to components of the stator assembly such as the teeth. Accordingly, the insulation increases the cost to assemble the electric motors. In addition, at least some known insulation is incompatible with processes for automatically winding the conduction coils about the bobbins and/or teeth.

BRIEF DESCRIPTION

In one aspect, a stator assembly for an electric motor assembly is provided. The stator assembly includes an annular body extending about a central axis and a plurality of stator teeth extending axially from the annular body and spaced circumferentially about the annular body. The plurality of stator teeth include a first stator tooth and a second stator tooth. The first stator tooth and the second stator tooth define a slot therebetween. The second stator tooth includes a proximal end and a distal end. The stator assembly also includes at least one conduction coil and at least one bobbin configured to support the at least one conduction coil. The at least one bobbin is coupled to the first stator tooth such that the at least one conduction coil extends about the first stator tooth. The stator assembly further includes at least one insulation member configured to couple to the second stator tooth and extend into the slot between the second stator tooth and the at least one conduction coil. The at least one insulation member includes an end wall configured to cover the distal end of the second stator tooth when the at least one insulation member is coupled to the second stator tooth.

In another aspect, a stator assembly for an electric motor assembly is provided. The stator assembly includes an annular body extending about a central axis. The stator assembly also includes a plurality of stator teeth extending axially from the annular body and spaced circumferentially about the annular body. The plurality of stator teeth include a first stator tooth and a second stator tooth. The first stator tooth and the second stator tooth define a slot therebetween. The stator assembly further includes at least one conduction coil and a cap. The cap is configured to couple to the annular body and to the plurality of stator teeth. The cap includes a first portion configured to couple to the first stator tooth. The first portion includes an insulation member configured to extend about the first stator tooth and into the slot. The cap also includes a second portion configured to couple to the second stator tooth and support the at least one conduction coil. The second portion is configured to couple to the second stator tooth such that the at least one conduction coil extends about the second stator tooth. The first portion couples to the second portion.

In yet another aspect, a stator assembly for an electric motor assembly is provided. The stator assembly includes an annular body extending about a central axis. The stator assembly also includes a plurality of stator teeth extending axially from the annular body and spaced circumferentially about the annular body. The plurality of stator teeth include a first stator tooth and a second stator tooth. The first stator tooth and the second stator tooth define a slot therebetween. The stator assembly further includes at least one conduction coil and a cap. The cap is configured to couple to the annular body and to the plurality of stator teeth. The cap includes a base extending about the central axis when the cap is coupled to the annular body. The cap also includes at least one bobbin extending from the base and configured to support the at least one conduction coil. The bobbin is configured to couple to the first stator tooth such that the at least one conduction coil extends about the first stator tooth. The cap further includes at least one flange extending from the base and spaced circumferentially from the at least one bobbin. The at least one flange extends between the second stator tooth and the at least one conduction coil when the cap is coupled to the annular body. The at least one flange is positionable relative to the base between a first position and a second position. The at least one flange and the base form a first angle when the at least one flange is in the first position and a second angle when the at least one flange is in the second position.

In yet another aspect, an electric motor assembly includes an annular body extending about a central axis and a hub extending along the central axis. The electric motor assembly also includes a plurality of stator teeth extending axially from the annular body and spaced circumferentially about the annular body. The plurality of stator teeth are spaced radially from the hub such that an annular space is defined between the hub and the plurality of stator teeth. The electric motor assembly further includes at least one conduction coil extending about at least one stator tooth of the plurality of stator teeth. The electric motor assembly also includes at least one insulation member coupled to at least one of the annular body, the hub, and the plurality of stator teeth. The at least one insulation member is configured to surround the hub and extend into the annular space between the hub and the at least one conduction coil.

Although specific features of various embodiments may be shown in some drawings and not in others, this is for convenience only. Any feature of any drawing may be referenced and/or claimed in combination with any feature of any other drawing.

DETAILED DESCRIPTION

The apparatus, methods, and systems described herein provide insulation members for a stator assembly of an electric motor. The insulation members electrically insulate components of the stator assembly from electric current flowing through conduction coils. For example, in some embodiments, the insulation members cover stator teeth. In some embodiments, the insulation members are included in a cap that is removably coupled to the stator teeth. In further embodiments, the insulation members couple to a hub of the stator assembly. The insulation members couple to the stator assembly without the use of tools. Accordingly, the insulation members reduce the cost to assemble stator assemblies. In addition, the insulation members facilitate automatic winding of conduction coils of the stator assembly.

Figure 1:
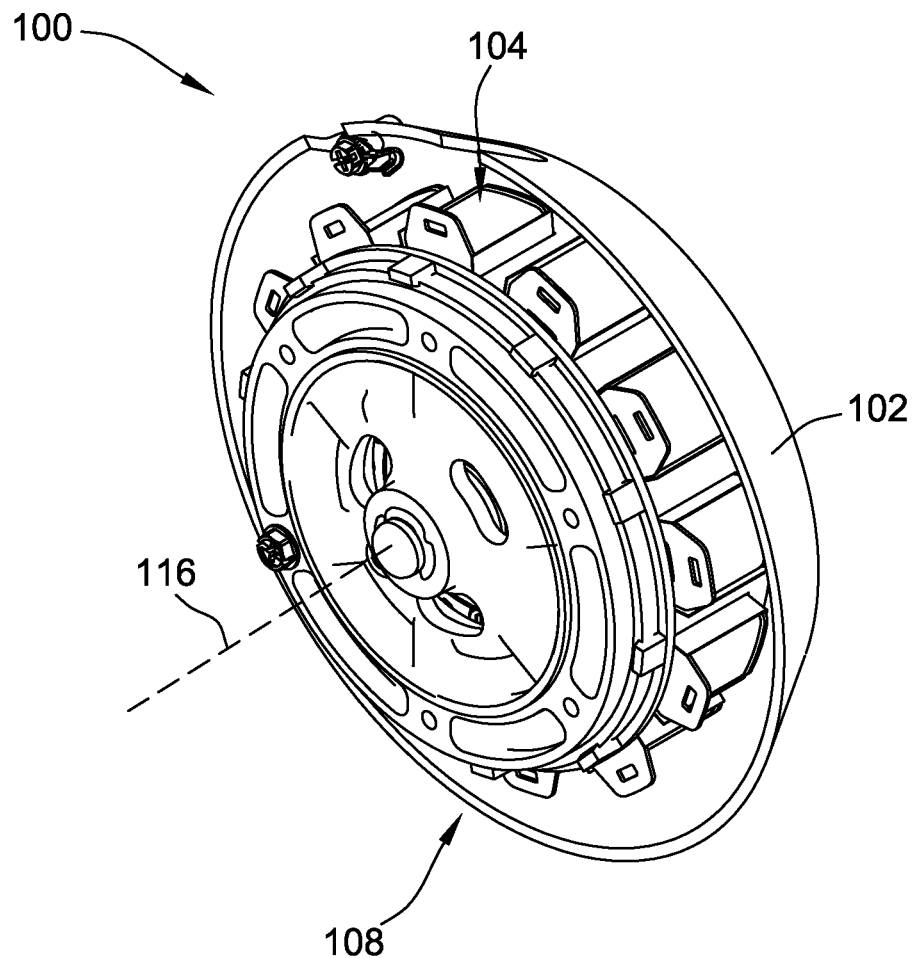
FIG. 1 is a perspective view of an exemplary electric motor assembly.
Figure 2:
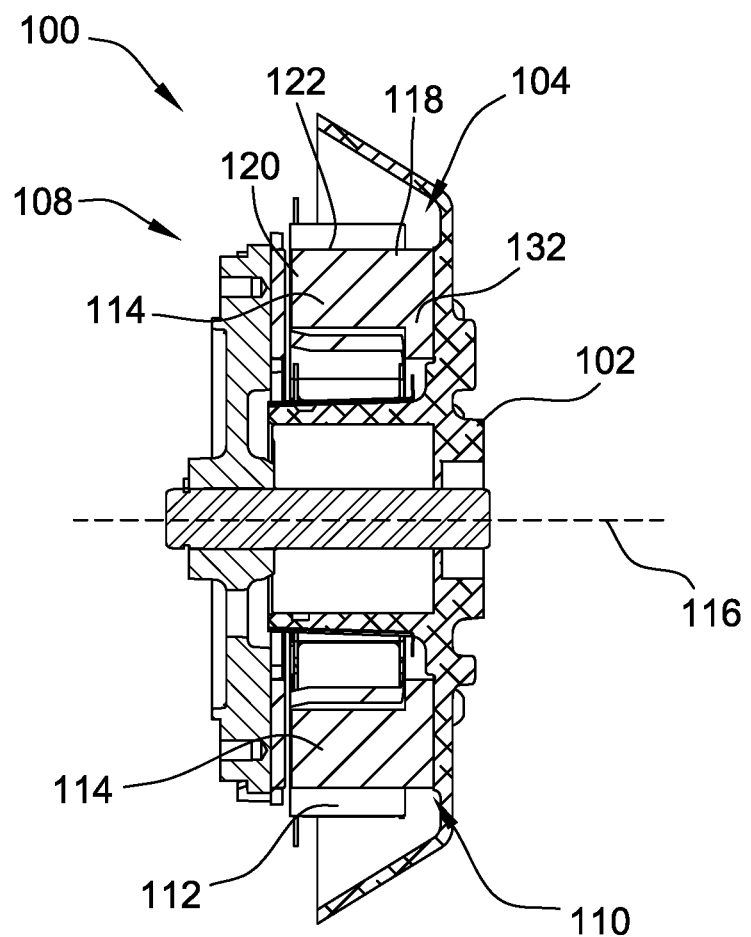
FIG. 2 is a cross-sectional view of the electric motor assembly shown in FIG. 1.

FIG. 1 is a perspective view an exemplary electric motor assembly 100. FIG. 2 is a cross-sectional view of electric motor assembly 100. In the exemplary embodiment, motor assembly 100 includes a motor housing 102, a stator assembly 104, and a rotor assembly 108. Stator assembly 104 includes a magnetic stator core 110 and a plurality of conduction coils 112. Each conduction coil 112 is coupled to one of a plurality of stator teeth 114. In some embodiments, motor assembly 100 includes one conduction coil 112 per stator tooth 114. In the exemplary embodiment, one conduction coil 112 is positioned on every other stator tooth 114. In operation, rotor assembly 108 is positioned adjacent stator assembly 104 and a voltage is applied to conduction coils 112 in sequence to cause rotation of rotor assembly 108. In alternative embodiments, electric motor assembly 100 has any configuration that enables electric motor assembly 100 to operate as described herein.

Figure 3:
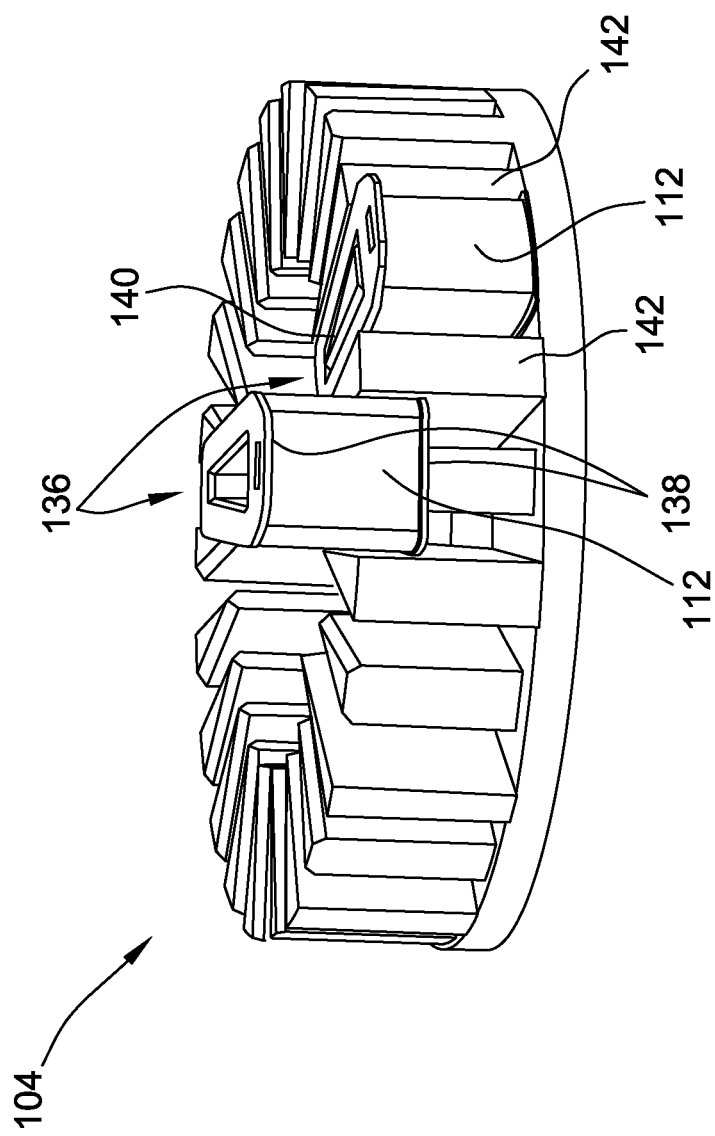
FIG. 3 is a perspective view of a stator assembly of the electric motor assembly shown in FIG. 1.

FIG. 3 is a perspective view of stator assembly 104 of electric motor assembly 100. Stator assembly 104 includes an annular body or backplane 132 extending about an axis 116. Stator teeth 114 extend axially from annular body 132. Stator teeth 114 are spaced circumferentially about annular body 132 and define slots 134 therebetween. Each stator tooth 114 includes a proximal end 118, a distal end 120, and sides 122. Each stator tooth 114 is coupled to annular body 132 at proximal end 118. Distal end 120 is opposite proximal end 118 and is spaced axially from annular body 132. Sides 122 extend between proximal end 118 and distal end 120. In alternative embodiments, stator assembly 104 includes any stator teeth 114 that enable stator assembly 104 to operate as described herein.

Also, in the exemplary embodiment, slots 134 are configured to receive conduction coils 112. For example, each conduction coil 112 is positioned on a former or bobbin 136 that is configured to support conduction coil 112. Specifically, each conduction coil 112 is wrapped around bobbin 136 between flanges 138 extending from ends of bobbin 136. Each bobbin 136 includes an opening 140 to receive one stator tooth 114. Bobbins 136 are coupled to every other stator tooth 114 of stator assembly 104 such that conduction coil 112 extends about stator tooth 114 and through slots 134. In particular, each conduction coil 112 extends through slots 134 on each side of the respective stator tooth 114. In the exemplary embodiment, bobbins 136 and conduction coils 112 are positioned on every other stator tooth 114. In alternative embodiments, conduction coils 112 are wound in any manner that enables stator assembly 104 to operate as described herein. For example, in some embodiments, bobbins 136 are omitted and conduction coils 112 are wound about stator teeth 114.

In addition, in the exemplary embodiment, stator assembly 104 includes a plurality of insulation members 142 to insulate components of stator assembly 104, such as annular body 132 and stator teeth 114, from electric current flowing through conduction coil 112. Insulation members 142 are made from a material that is substantially nonconductive. For example, in some embodiments, insulation members 142 are plastic and/or any other material suitable for use as a nonconductive barrier. In addition, in some embodiments, each insulation member 142 is formed as a single piece. In alternative embodiments, stator assembly 104 includes any insulation member 142 that enables stator assembly 104 to operate as described herein.

Moreover, in the exemplary embodiment, insulation members 142 extend into slots 134 between conduction coils 112 and stator teeth 114. More specifically, each insulation member extends between a first stator tooth 114 and a first conduction coil 112 disposed on a second stator tooth 114 adjacent the first stator tooth 114. Accordingly, insulation members 142 insulate stator teeth 114 from electric current flowing through conduction coil 112. In alternative embodiments, insulation member 142 has any configuration that enables stator assembly 104 to operate as described herein.

Also, in the exemplary embodiment, insulation member 142 simplifies assembly of stator assembly 104. For example, insulation member 142 facilitates automatic winding of conduction coils 112. In addition, insulation member 142 is installed without the use of tools. Moreover, insulation member 142 is modular and is compatible with different stator assemblies 104.

Figure 4:
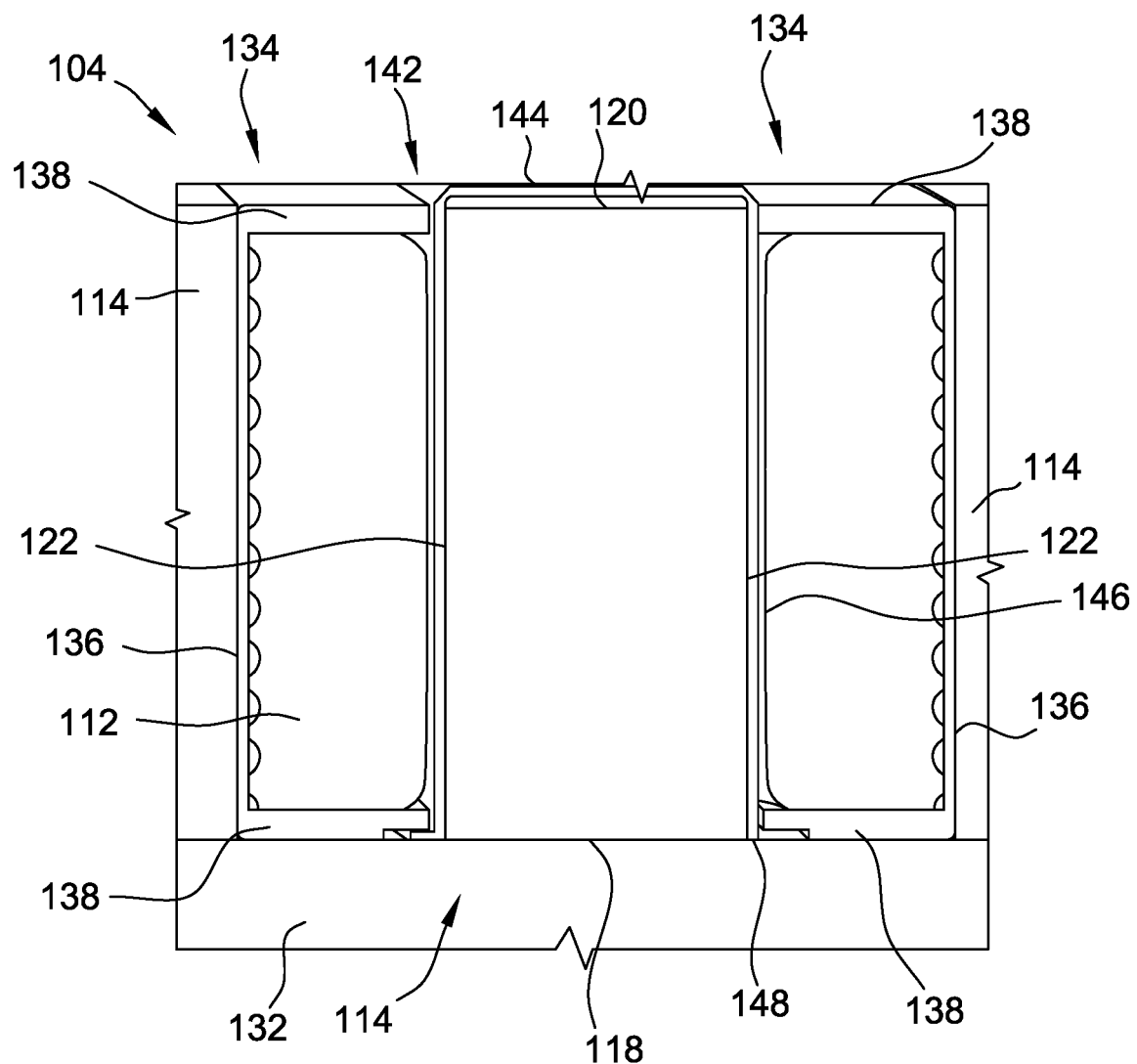
FIG. 4 is a cross-sectional view of a portion of the stator assembly shown in FIG. 3 including an insulation member.
Figure 5:
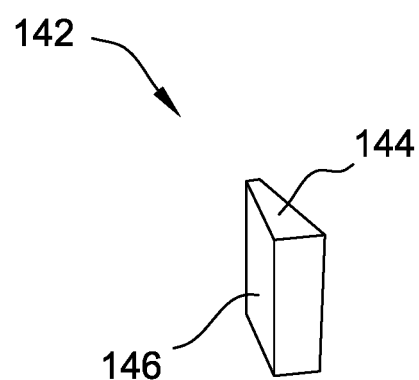
FIG. 5 is a perspective view of the insulation member shown in FIG. 4.

FIG. 4 is a cross-sectional view of a portion of stator assembly 104 including insulation member 142. FIG. 5 is a perspective view of insulation member 142. Insulation member 142 includes an end wall 144 and a sidewall 146 extending along an edge of end wall 144. In addition, sidewall 146 defines an opening 148 configured to receive at least one stator tooth 114. In the exemplary embodiment, insulation member 142 is formed in a shape substantially similar to stator teeth 114 and insulation member 142 conforms to stator teeth 114 when insulation member 142 is coupled to stator teeth 114. Insulation member 142 is configured to couple to stator teeth 114 such that insulation member 142 substantially covers surfaces of stator teeth 114 and insulates each stator tooth 114 from electric current flowing through conduction coils 112. Specifically, end wall 144 extends across distal end 120 of stator teeth 114 when insulation member 142 is coupled to stator teeth 114 and sidewall 146 extends across sides 122 of stator teeth 114 from proximal end 118 to distal end 120 when insulation member 142 is coupled to stator teeth 114. End wall 144 and sidewall 146 are continuous and free of openings such that insulation member 142 covers the entirety of distal end 120 and sides 122. In alternative embodiments, insulation member 142 covers any portion of stator teeth 114 that enables insulation member 142 to operate as described herein.

In reference to FIGS. 2 and 3, a method of assembling stator assembly 104 includes coupling insulation member 142 to first stator tooth 114 such that insulation member 142 covers first stator tooth 114. In particular, stator tooth 114 is received in opening 148 such that sidewall 146 extends about stator tooth 114 and such that end wall 144 extends across distal end 120 of stator tooth 114. The method also includes coupling conduction coil 112 to bobbin 136 and coupling bobbin 136 to stator tooth 114 such that conduction coil 112 extends about stator tooth 114. In some embodiments, conduction coil 112 is at least partially wound by an automatic winding device. Bobbin 136 and insulation member 142 facilitate the automatic winding of conduction coil 112. In particular, in some embodiments, insulation member 142 is coupled to stator teeth 114 and conduction coil 112 is wound about bobbin 136 prior to bobbin 136 coupling to stator teeth 114.

Figure 6:
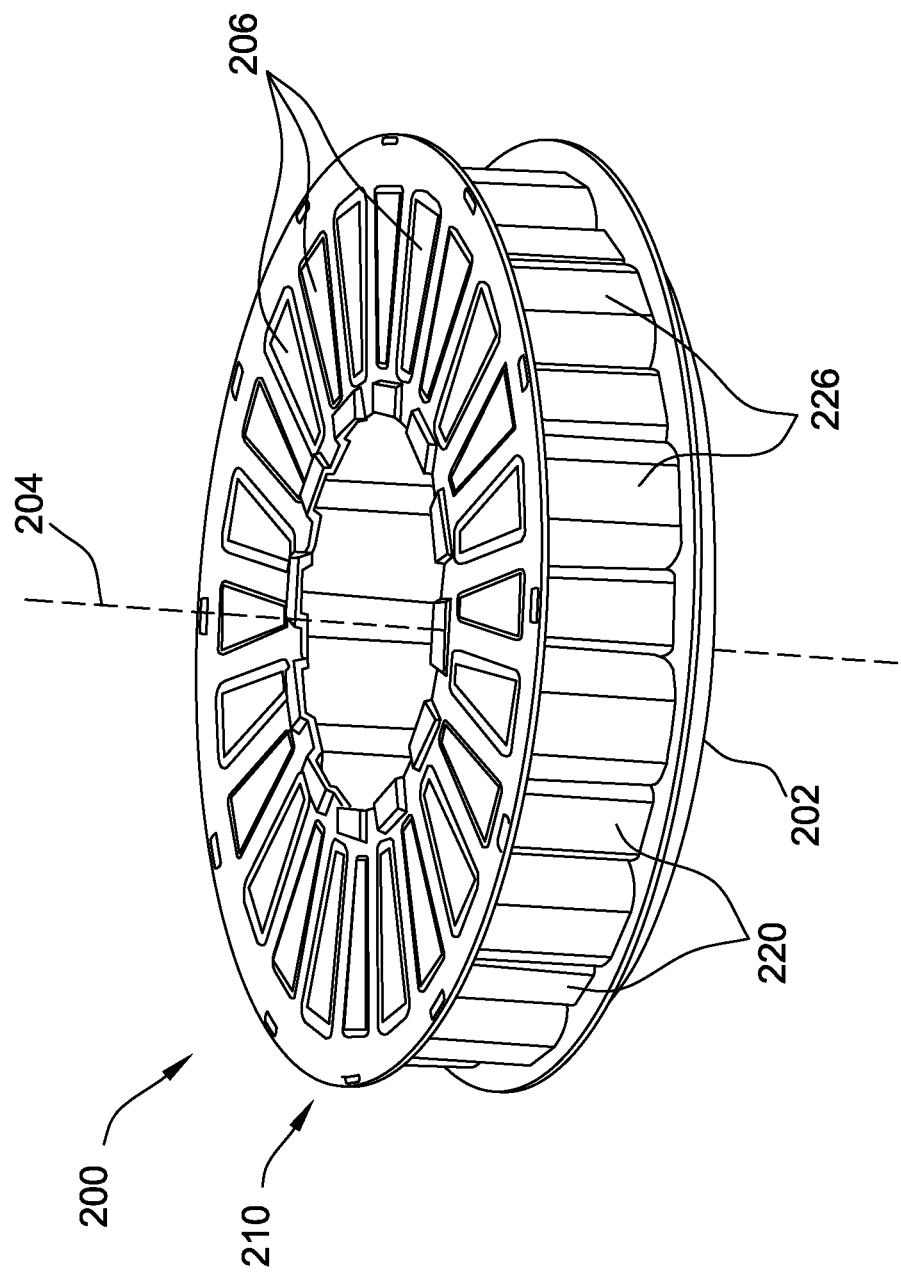
FIG. 6 is a perspective view of another embodiment of a stator assembly for use with the electric motor assembly shown in FIGS. 1 and 2.
Figure 7:
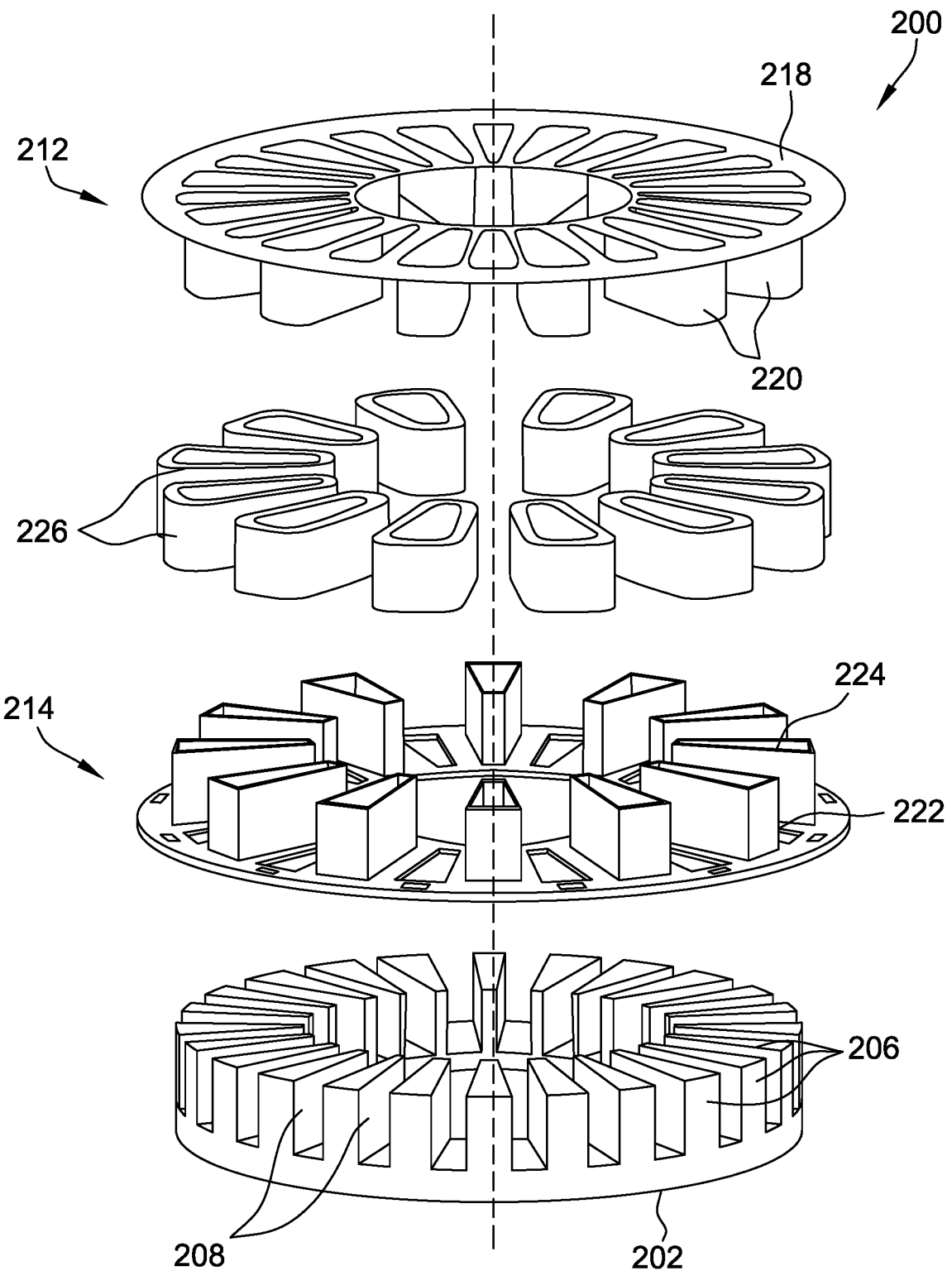
FIG. 7 is an exploded perspective view of the stator assembly shown in FIG. 6.

FIG. 6 is a perspective view of another embodiment of a stator assembly 200 for use with electric motor assembly 100 (shown in FIGS. 1 and 2). FIG. 7 is an exploded perspective view of the stator assembly 200. Stator assembly 200 includes an annular body 202 extending about a central axis 204 and a plurality of stator teeth extending axially from annular body 202. Stator teeth 206 are spaced equal angular distances about central axis 204. Stator teeth 206 define a plurality of slots 208 therebetween. In alternative embodiments, stator assembly 200 has any configuration that enables stator assembly 200 to operate as described herein.

In the exemplary embodiment, stator assembly 200 includes a cap 210 configured to couple to annular body 202 and to stator teeth 206. Cap 210 includes a first portion 212 and a second portion 214. First portion 212 includes a first base 218 and a plurality of insulation members 220 extending from first base 218. First portion 212 is configured to couple to stator teeth 206 and annular body 202 such that each insulation member 220 extends about a respective stator tooth 206 and into slots 208 on either side of stator tooth 206. Second portion 214 includes a second base 222 and a plurality of bobbins 224 extending from second base 222. Bobbins 224 are configured to support conduction coils 226 and couple to stator teeth 206 such that conduction coils 226 on bobbins 224 extend about stator teeth 206. Accordingly, cap 210 facilitates automatic winding of stator assembly 200, and insulates annular body 202 and stator teeth 206 from electric current flowing through conduction coils 226. In alternative embodiments, stator assembly 200 includes any portion that enables stator assembly 200 to operate as described herein. For example, in some embodiments, first base 218 and/or second base 222 is omitted from first portion 212 and/or second portion 214. In further embodiments, cap 210 includes three or more portions.

In addition, in the exemplary embodiment, first portion 212 couples to second portion 214 such that insulation members 220 and bobbins 224 extend between first base 218 and second base 222 in an alternating pattern. Accordingly, first portion 212 and second portion 214 secure conduction coils 226 in position on bobbins 224. In some embodiments, conduction coils 226 are wound on bobbins 224 prior to coupling first portion 212 to second portion 214. In alternative embodiments, first portion 212 and second portion 214 are coupled in any manner that enables stator assembly 200 to operate as described herein.

Also, in the exemplary embodiment, cap 210 has a shape that corresponds to a shape of annular body 202. Specifically, in the exemplary embodiment, cap 210 is annular and is substantially the same size as annular body 202. In addition, bobbins 224 and insulation members 220 conform to a shape of stator teeth 206. In alternative embodiments, cap 210 has any size and shape that enables cap 210 to operate as described herein.

Moreover, in the exemplary embodiment, first portion 212 and second portion 214 are constructed from an electrically insulative or nonconductive material such as plastic. In addition, each of first portion 212 and second portion 214 is formed as a single piece. Accordingly, cap 210 has a two part configuration. In alternative embodiments, cap 210 is formed in any manner that enables stator assembly 200 to operate as described herein. For example, in some embodiments, cap 210 is assembled from three or more pieces. In further embodiments, first portion 212 is coupled to second portion 214 such that first portion 212 is positionable relative to second portion 214.

As a result, in the exemplary embodiment, cap 210 simplifies the assembly of stator assembly 200. For example, in some embodiments, during assembly of stator assembly 200, conduction coils 226 are wound about bobbins 224 and first portion 212 is coupled to second portion 214. After conduction coils 226 are wound, first portion 212, second portion 214, and conduction coils 226 are coupled to stator teeth 206 and annular body 202 as a single piece. Cap 210 supports conduction coils 226 and insulates components of stator assembly 200, such as stator teeth 206 and annular body 202, from electric current flowing through conduction coils 226. Cap 210 is coupled to annular body 202 such that second base 222 contacts annular body 202. In alternative embodiments, stator assembly 200 is assembled in any manner that enables stator assembly 200 to operate as described herein.

Figure 8:
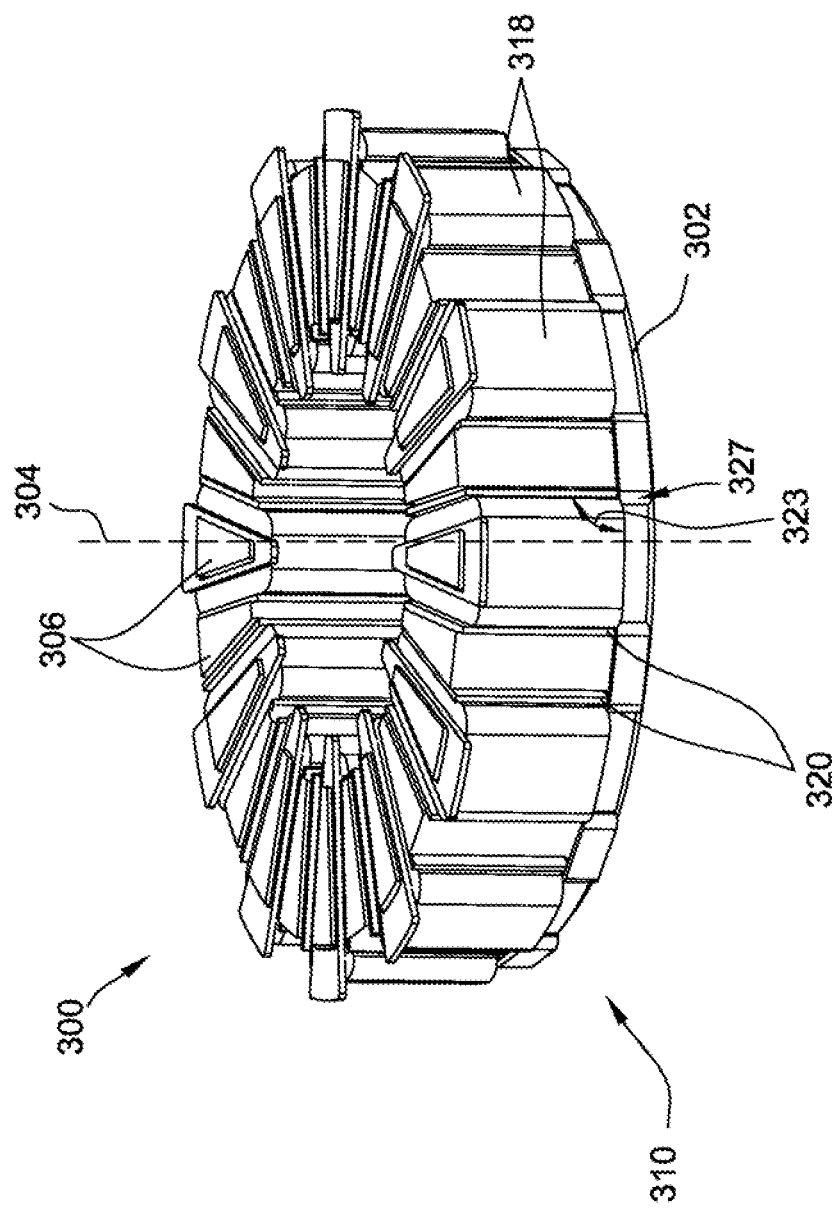
FIG. 8 is a perspective view of another embodiment of a stator assembly for use with the electric motor assembly shown in FIGS. 1 and 2.
Figure 9:
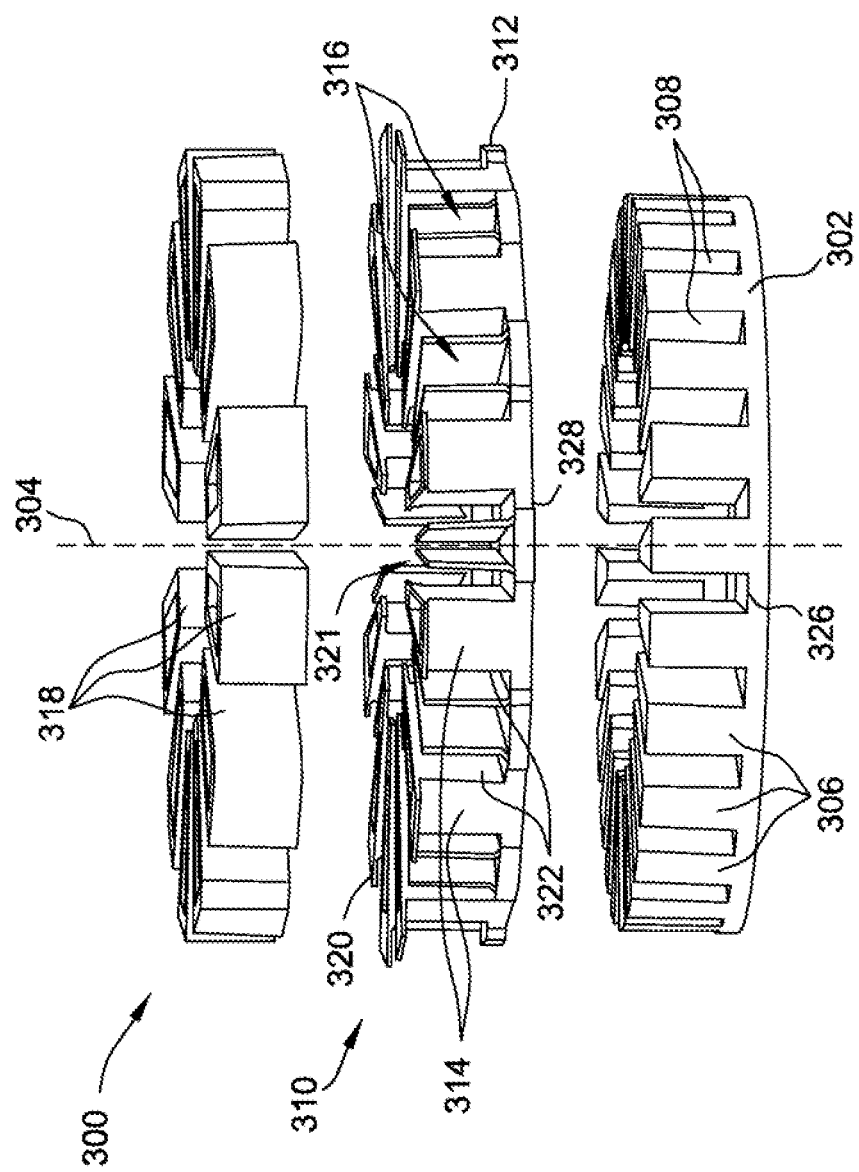
FIG. 9 is an exploded perspective view of the stator assembly shown in FIG. 8.
Figure 10:
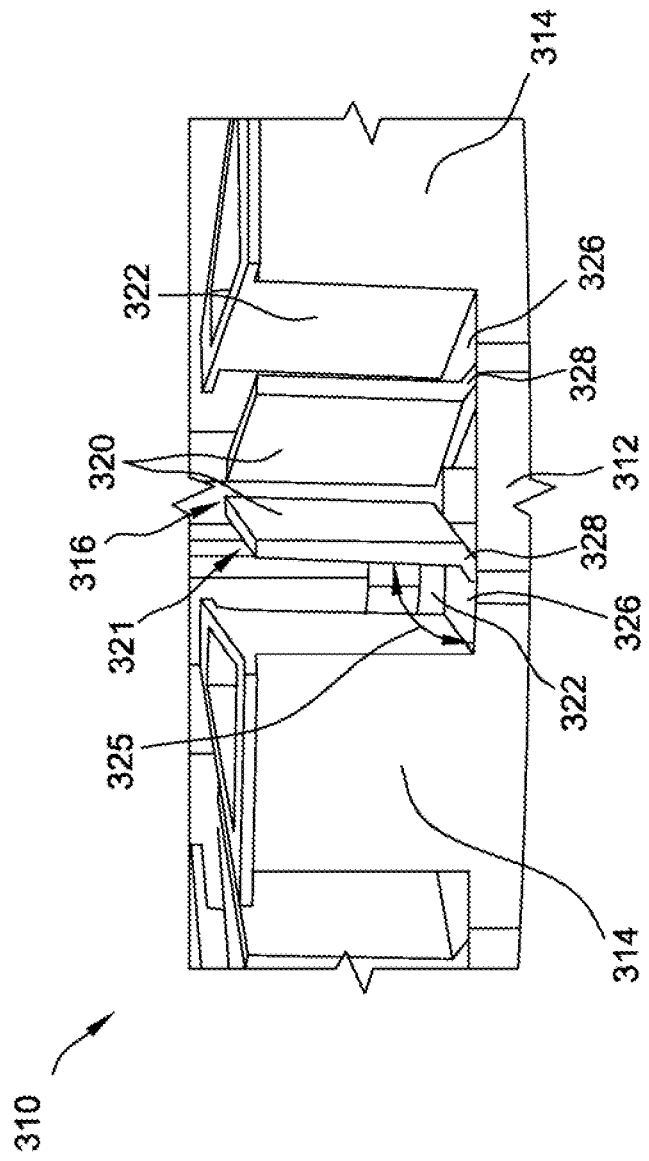
FIG. 10 is an enlarged perspective view of a cap of the stator assembly shown in FIGS. 8 and 9.

FIG. 8 is a perspective view of another embodiment of a stator assembly 300 for use with electric motor assembly 100 (shown in FIGS. 1 and 2). FIG. 9 is an exploded perspective view of stator assembly 300. FIG. 10 is an enlarged perspective view of a cap 310 of stator assembly 300. Stator assembly 300 includes an annular body 302 extending about a central axis 304 and a plurality of stator teeth 306 extending axially from annular body 302. Stator teeth 306 are spaced equal angular distances about central axis 304. Stator teeth 306 define a plurality of slots 308 therebetween. In alternative embodiments, stator assembly 300 has any configuration that enables stator assembly 300 to operate as described herein.

In the exemplary embodiment, cap 310 is configured to couple to annular body 302 and to stator teeth 306. Cap 310 includes a base 312 configured to extend about central axis 304. Cap 310 also includes a plurality of bobbins 314 and a plurality of insulation members 316 extending from base 312. Bobbins 314 are configured to receive stator teeth 306 therein and support conduction coils 318 about stator teeth 306 when conduction coils 318 are coupled to bobbins 314 and cap 310 is coupled to stator teeth 306.

Also, in the exemplary embodiment, each insulation member 316 includes a pair of flanges 320. Flanges 320 extend from base 312 and are spaced circumferentially from bobbins 314. Flanges 320 and bobbins 314 define slots 322 therebetween. Conduction coils 318 extend through slots 322 when conduction coils 318 are coupled to bobbins 314. In addition, first and second flanges 320 of each insulation member 316 are spaced apart and configured to receive a first stator tooth 306 therebetween. When cap 310 is coupled to annular body 302, flanges 320 extend along opposite sides of a stator tooth 306 between the respective stator tooth 306 and conduction coil 318. Accordingly, insulation members 316 electrically insulate stator teeth 306 from electric current flowing through conduction coils 318.

Moreover, in the exemplary embodiment, each flange 320 is positionable relative to base. For example, in some embodiments, each flange 320 is positionable relative to base 312 between a first position 321 (shown in FIGS. 9 and 10) and a second position 327 (shown in FIG. 8). In the first position 321, flange 320 and a surface 326 of base 312 form a first angle 325. In the second position 327, flange 320 and surface 326 of base 312 form a second angle 323. The first angle 325 is larger than the second angle 323. Moreover, the first angle 325 is obtuse such that flange 320 angles away from bobbin 314 when flange 320 is in the first position. Accordingly, the first position 321 provides an increased size of slots 322 between flanges 320 and bobbins 314 and facilitates winding of conduction coils 318 around bobbins 314 and through slots 322. The second angle 323 is less than the first angle 325. For example, in some embodiments, the second angle 323 is equal to or less than 90° such that flange 320 angles towards bobbin 314 when flange 320 is in the second position 327. Accordingly, the second position 327 enables stator teeth 306 to fit between respective flanges 320 and facilitates insulation members 316 insulating stator teeth 306. In alternative embodiments, flanges 320 extend at any angle that enables stator assembly 300 to operate as described herein.

Also, in the exemplary embodiment, each flange 320 is coupled to base 312 by at least one hinge 328. In the exemplary embodiment, hinge 328 is a living hinge and allows pivoting movement of flange 320 relative to base 312. In alternative embodiments, flange 320 is coupled to base 312 in any manner that enables cap 310 to operate as described herein. For example, in some embodiments, hinge 328 includes a mechanical hinge. In further embodiments, flange 320 is removeably coupled to base 312.

In addition, in the exemplary embodiment, stator teeth 306 are configured to contact flange 320 and move flange 320 between the first position and the second position. For example, stator teeth 306 are configured to move flange 320 from the first position to the second position when the cap 310 is coupled to stator teeth 306. Specifically, the stator teeth 306 direct flanges 320 toward conduction coil 318 and bobbin 314 when cap 310 is coupled to stator teeth 306. When cap 310 is removed from stator teeth 306, stator teeth 306 allow flanges to move away from conduction coil 318 and bobbin 314, and move from the second position to the first position. In alternative embodiments, flanges 320 are positionable in any manner that enables stator assembly 300 to operate as described herein.

Moreover, in the exemplary embodiment, the space between flanges 320 and bobbins 314 decreases when flanges 320 are moved from the first position to the second position. In contrast, the space between adjacent flanges 320 increases when flanges 320 are moved from the first position to the second position. As a result, flanges 320 provide additional space for winding conduction coil 318 when flanges 320 are in the first position and facilitate securing conduction coils 318 in positon on stator assembly 300 when flanges are in the second position. Accordingly, flanges 320 allow conduction coils 318 to be wound about bobbins 314 prior to coupling cap 310 to stator teeth 306 and simplify assembly of stator assembly 300.

Figure 11:
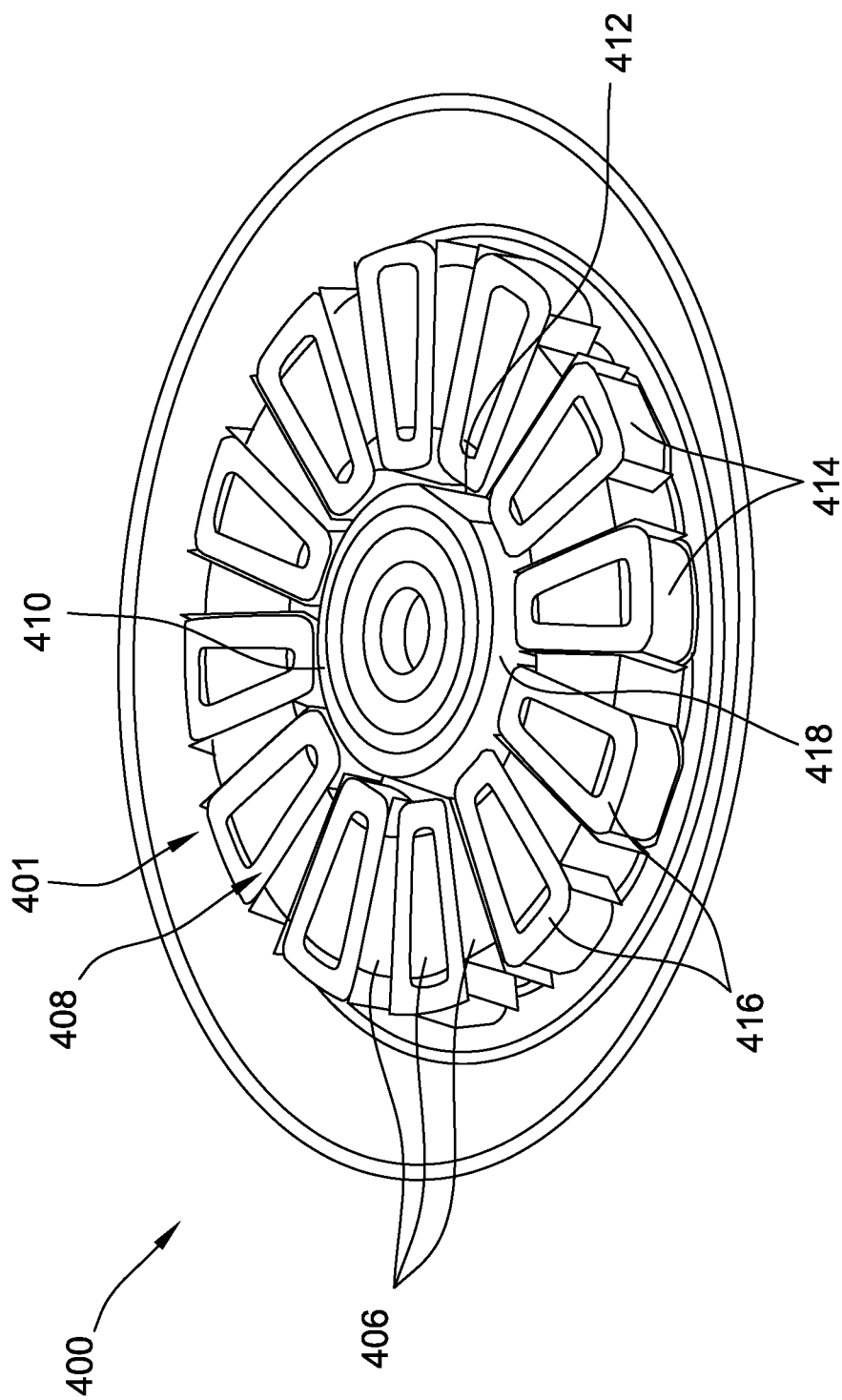
FIG. 11 is a perspective view of another embodiment of an electric motor assembly including a stator assembly.
Figure 12:
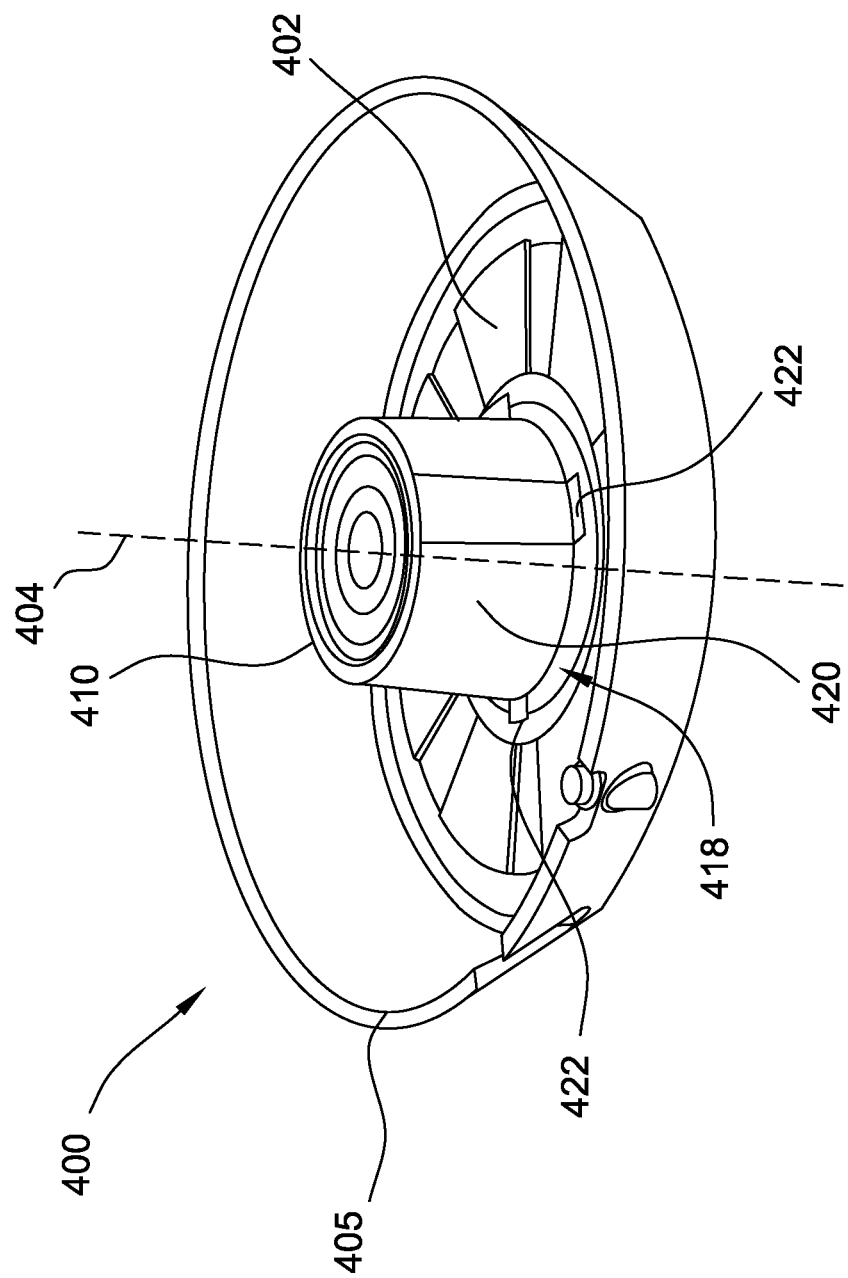
FIG. 12 is a perspective view of a portion of the stator assembly shown in FIG. 11.

FIG. 11 is a perspective view of another embodiment of a motor assembly 400 including a stator assembly 401. FIG. 12 is a perspective view of a portion of stator assembly 401. Stator assembly 401 includes an annular body 402 extending about a central axis 404 and a plurality of stator teeth 406 extending axially from annular body 402. Stator teeth 406 are spaced equal angular distances about central axis 404. Stator teeth 406 define a plurality of slots 408 therebetween. In alternative embodiments, stator assembly 401 has any configuration that enables motor assembly 400 to operate as described herein.

In the exemplary embodiment, a hub 410 extends axially from a housing 405 of motor assembly 400 along central axis 404. Stator teeth 406 are spaced radially from hub 410 such that an annular space 412 is defined between hub 410 and stator teeth 406. Hub 410 is configured to receive a bearing and a shaft (not shown) such that the shaft is allowed to rotate relative to stator assembly 401. In alternative embodiments, stator assembly 401 includes any hub 410 that enables stator assembly 401 to operate as described herein.

In addition, in the exemplary embodiment, stator assembly 401 includes conduction coils 414 extending about stator teeth 406. Conduction coils 414 extend through slots 408 and into annular space 412. For example, in some embodiments, conduction coils 414 are wound about bobbins 416 and bobbins 416 are coupled to stator teeth 406. In alternative embodiments, conduction coils 414 are wound in any manner that enables stator assembly 401 to operate as described herein.

Also, in the exemplary embodiment, stator assembly 401 includes an insulation member 418 configured to couple to hub 410 and extend into annular space 412 between hub 410 and conduction coils 414. In the exemplary embodiment, insulation member 418 surrounds hub 410. Accordingly, insulation member 418 electrically insulates hub 410 from electric current flowing through conduction coils 414. In some embodiments, insulation member 418 is coupled to annular body 402, stator teeth 406, conduction coils 414, bobbins 416, hub 410, and/or housing 405. In alternative embodiments, insulation member 418 is coupled to any component of motor assembly 400 that enables motor assembly 400 to operate as described herein.

Figure 13:
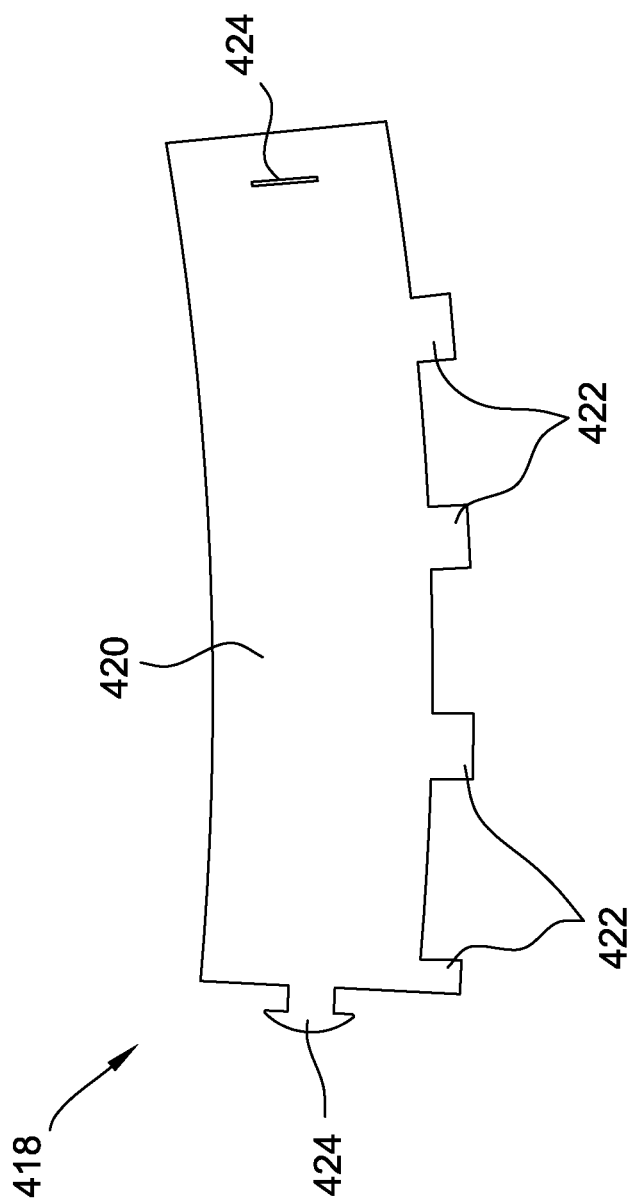
FIG. 13 is a plan view of an insulation member of the stator assembly shown in FIG. 11.
Figure 14:
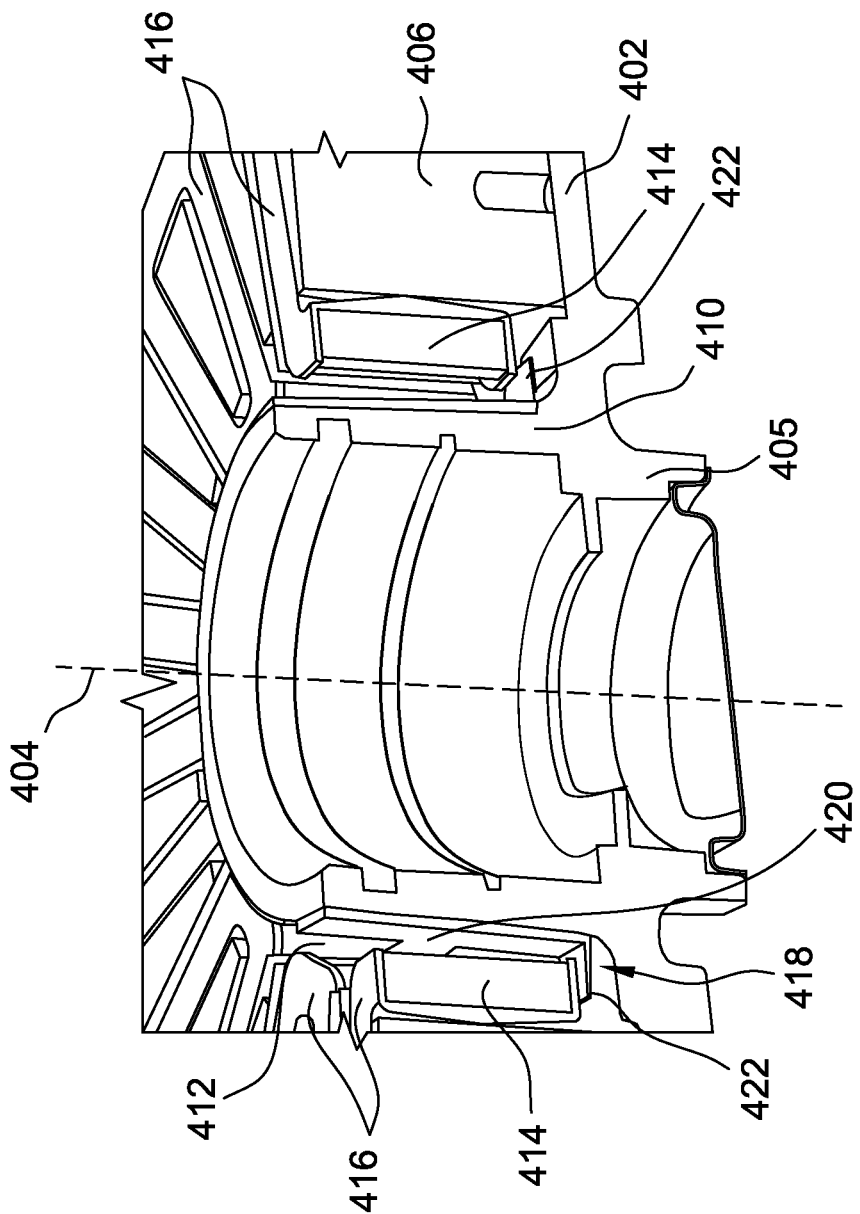
FIG. 14 is a cross-sectional view of a portion of the stator assembly shown in FIG. 11.

FIG. 13 is a plan view of insulation member 418 of stator assembly 401 in a first configuration. FIG. 14 is a cross-sectional view of a portion of stator assembly 401 including insulation member 418 in a second configuration. Insulation member 418 has a first configuration (shown in FIG. 13) and a second configuration (shown in FIG. 14). Insulation member 418 is substantially planar in the first configuration. In the second configuration, insulation member 418 conforms to a shape of hub 410. In the exemplary embodiment, insulation member 418 is cylindrical in the second configuration. Accordingly, insulation member 418 simplifies assembly of stator assembly 401. In alternative embodiment, insulation member 418 has any configuration that enables stator assembly 401 to operate as described herein.

In addition, in the exemplary embodiment, insulation member 418 includes a body 420, a plurality of tabs 422, and at least one engagement feature 424. Body 420 is flexible to facilitate insulation member 418 moving between the first configuration and the second configuration. Engagement features 424 are configured to secure insulation member 418 in the second configuration. For example, engagement features 424 include a hook and an opening configured to receive the hook. In alternative embodiments, insulation member 418 includes any components that enable insulation member 418 to function as described herein.

Moreover, in the exemplary embodiment, tabs 422 extend from an edge of body 420. Tabs 422 are positionable and are configured to engage components of stator assembly 401 such as bobbins 416. Accordingly, tabs 422 facilitate insulation member 418 remaining in position on hub 410. In the exemplary embodiment, insulation member 418 includes four tabs 422. In alternative embodiments, insulation member 418 includes any tab 422 that enables insulation member 418 to operate as described herein.

The apparatus, methods, and systems described herein provide insulation members for a stator assembly of an electric motor. The insulation members electrically insulate components of the stator assembly from electric current flowing through conduction coils. For example, in some embodiments, the insulation members cover stator teeth. In some embodiments, the insulation members are included in a cap that is removably coupled to the stator teeth. In further embodiments, the insulation members couple to a hub of the stator assembly. The insulation members couple to the stator assembly without the use of tools. Accordingly, the insulation members reduce the cost to assemble stator assemblies. In addition, the insulation members facilitate automatic winding of conduction coils of the stator assembly.

Exemplary embodiments of an electric motor assembly are described above in detail. The electric motor assembly and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A stator assembly for an electric motor assembly, said stator assembly comprising:
    an annular body extending about a central axis;
    a plurality of stator teeth extending axially from said annular body and spaced circumferentially about said annular body, said plurality of stator teeth including a first stator tooth and a second stator tooth, said first stator tooth and said second stator tooth defining a slot therebetween, said second stator tooth including a proximal end and, a distal end opposite said proximal end, wherein said second stator tooth is coupled to said annular body at said proximal end, and wherein said distal end is spaced axially from said annular body;
    at least one conduction coil;
    at least one bobbin configured to support said at least one conduction coil, said at least one bobbin coupled to said first stator tooth such that said at least one conduction coil extends about said first stator tooth; and
    at least one insulation member configured to couple to said second stator tooth and extend into said slot between said second stator tooth and said at least one conduction coil, wherein said at least one insulation member includes an end wall and a sidewall coupled to said end wall, said end wall configured to cover said distal end of said second stator tooth and said sidewall configured to extend around said second stator tooth when said at least one insulation member is coupled to said second stator tooth, wherein said sidewall defines an opening and is configured to receive said second stator tooth therein, said at least one insulation member is configured to couple to said second stator tooth by inserting said second stator tooth through the opening.

2. The stator assembly in accordance with claim 1, wherein said at least one insulation member is coupled to said second stator tooth such that said sidewall extends from said distal end to said proximal end.

3. The stator assembly in accordance with claim 1, wherein said at least one insulation member conforms to a shape of said second stator tooth.

4. The stator assembly in accordance with claim 1, wherein said at least one insulation member is formed as a single piece.

5. The stator assembly in accordance with claim 1, wherein said at least one insulation member is plastic.

6. The stator assembly in accordance with claim 1, wherein said at least one insulation member comprises a plurality of insulation members, wherein each insulation member of said plurality of insulation members is a separate piece.

7. A stator assembly for an electric motor assembly, said stator assembly comprising:
    an annular body extending about a central axis;
    a plurality of stator teeth extending axially from said annular body and spaced circumferentially about said annular body, said plurality of stator teeth including a first stator tooth and a second stator tooth, said first stator tooth and said second stator tooth defining a slot therebetween;
    at least one conduction coil;
    a cap configured to couple to said annular body and to said plurality of stator teeth, said cap including:
        a first portion configured to couple to said first stator tooth, said first portion including a first base extending about the central axis and at least one insulation member formed integrally with and extending axially from said first base, wherein said first portion is integrally formed as a single piece, said at least one insulation member configured to extend about said first stator tooth and into the slot, wherein said first base is annular and substantially the same size as said annular body; and
        a second portion configured to couple to said second stator tooth and support said at least one conduction coil, said second portion coupled to said second stator tooth such that said at least one conduction coil extends about said second stator tooth, wherein said first portion couples to said second portion.

8. The stator assembly in accordance with claim 7, wherein said second portion includes a second base and at least one bobbin extending from said second base, wherein said first portion couples to said second portion such that said at least one insulation member and said at least one bobbin extend between said first base and said second base.

9. The stator assembly in accordance with claim 7, wherein said second portion has a shape corresponding to a shape of said annular body.

10. The stator assembly in accordance with claim 7, wherein said first portion and said second portion include an electrically insulative material.

11. A stator assembly for an electric motor assembly, said stator assembly comprising:
an annular body extending about a central axis;
a plurality of stator teeth extending axially from said annular body and spaced circumferentially about said annular body, said plurality of stator teeth including a first stator tooth and a second stator tooth, said first stator tooth and said second stator tooth defining a slot therebetween;
at least one conduction coil;
a cap configured to couple to said annular body and to said plurality of stator teeth, said cap including:
a base extending about the central axis when said cap is coupled to said annular body;
at least one bobbin coupled to and extending from said base and configured to support said at least one conduction coil, said bobbin configured to couple to said first stator tooth such that said at least one conduction coil extends about said first stator tooth; and
at least one flange coupled to and extending from said base and spaced circumferentially from said at least one bobbin, wherein said cap is a single piece wherein said at least one flange extends between said second stator tooth and said at least one conduction coil when said cap is coupled to said annular body, wherein said at least one flange is positionable relative to said base between a first position and a second position to facilitate placement of the bobbin on the stator tooth, wherein said at least one flange and said base form a first angle when said at least one flange is in the first position and a second angle when said at least one flange is in the second position, and wherein said at least one flange is coupled to said base when said at least one flange is in the first position and the second position.

12. The stator assembly in accordance with claim 11, wherein said at least one flange is coupled to said base by at least one hinge.

13. The stator assembly in accordance with claim 11, wherein said second stator tooth is configured to contact said at least one flange and move said at least one flange between the first position and the second position when said cap is coupled to said annular body.

14. The stator assembly in accordance with claim 11, wherein said at least one flange comprises a first flange and a second flange, wherein said first flange and said second flange are spaced apart and are configured to receive said second stator tooth therebetween.

15. An electric motor assembly comprising:
an annular body extending about a central axis;
a hub extending axially from said annular body and along the central axis;
a plurality of stator teeth extending axially from said annular body and spaced circumferentially about said annular body, wherein said plurality of stator teeth are spaced radially from said hub such that an annular space is defined between said hub and said plurality of stator teeth;
at least one conduction coil extending about at least one stator tooth of said plurality of stator teeth; and
at least one insulation member coupled to at least one of said annular body, said hub, and said plurality of stator teeth, wherein said at least one insulation member is configured to surround said hub and extend into the annular space between said hub and said at least one conduction coil.

16. The electric motor assembly in accordance with claim 15, wherein said at least one insulation member is coupled to said hub.

17. The electric motor assembly in accordance with claim 16, wherein said at least one insulation member has first configuration and a second configuration, wherein said at least one insulation member is substantially planar in the first configuration and conforms to a shape of said hub in the second configuration.

18. The electric motor assembly in accordance with claim 15 further comprising at least one bobbin configured to support said at least one conduction coil, wherein said at least one insulation member includes at least one tab configured to engage said at least one bobbin.

\* \* \* \* \*